United States Patent [19]

Galante

[11] Patent Number: 4,548,857

[45] Date of Patent: Oct. 22, 1985

[54] HEAT TRANSFERABLE LAMINATE

[75] Inventor: Richard J. Galante, Milford, Mass.

[73] Assignee: Dennison Manufacturing Co., Framingham, Mass.

[21] Appl. No.: 653,482

[22] Filed: Sep. 21, 1984

Related U.S. Application Data

[63] Continuation of Ser. No. 536,056, Sep. 26, 1983, abandoned.

[51] Int. Cl.[4] ..................... B32B 7/06; B32B 7/10

[52] U.S. Cl. ..................... 428/200; 156/239; 156/240; 428/201; 428/202; 428/207; 428/336; 428/349; 428/354; 428/355; 428/913; 428/914

[58] Field of Search ..................... 428/347, 349, 355, 200, 428/913, 354, 201, 202, 207, 346, 336; 156/22, 9, 240, 89

[56] References Cited

U.S. PATENT DOCUMENTS

| | | | |
|---|---|---|---|
| 2,746,877 | 5/1956 | Matthes | 428/200 |
| 3,007,829 | 11/1961 | Akkeron | 156/89 |
| 3,616,015 | 10/1971 | Kingston | 156/239 |
| 3,922,435 | 11/1975 | Asnes | 428/349 |
| 4,392,905 | 7/1983 | Boyd et al. | 428/349 |

*Primary Examiner*—Thomas J. Herbert
*Attorney, Agent, or Firm*—Barry D. Josephs

[57] ABSTRACT

A heat transferable laminate wherein an ink design image is transferred from a carrier support to a receiving article, typically a plastic bottle or container, by application of heat to the carrier. The heat transferable laminate is composed of a carrier support, release coating, an ink design layer, and improved adhesive coating thereon.

The improved adhesive coating is prepared from a mix containing an adhesive component and a film-forming component blended in a miscible solvent. The solvent evaporates upon drying the coating. The adhesive component contains a blend of vinylacetate/ethylene copolymer and a styrene-based resin. The adhesive coating is equally suitable as an adhesive on heat transferable laminates for transfer to a wide variety of plastic articles including polyolefins, polystyrene, and polyvinylchloride. The improved adhesive coating obviates a long standing prior art need to pretreat polyolefin receiving articles as by preflaming prior to applying the heat transferable laminate thereto. The improved adhesive formulation exhibits a wide array of advantageous properties for the intended application. These properties include uniform coatability on wax or nonwax release and on ink at low coating thickness, highly sensitive heat activatable tackification, maintenance of film integrity during heat transfer of the laminate to the receiving article, high bonding strength, and abrasion resistence.

14 Claims, 1 Drawing Figure

HEAT TRANSFERABLE LAMINATE

This application is a continuation of application Ser. No. 536,056, filed Sept. 26, 1983, now abandoned.

BACKGROUND OF THE INVENTION

1. Field of the Invention

The present invention relates to a heat transferable label and improved adhesive composition therefor.

2. Description of the Prior Art

Prior art heat transferable labels for imprinting designs onto an article typically involve decorative laminates consisting of a paper base sheet or web coated with a wax or polymeric release layer over which a design is imprinted in ink. In transferable labels of this type, it is preferable to overcoat the ink design with an adhesive coating layer, which makes it easier to transfer the ink design from the web onto a receiving article such as a plastic or glass container or bottle.

U.S. Pat. No. 3,616,015 is illustrative of the prior art. In U.S. Pat. No. 3,616,015 a label-carrying web, such as a paper sheet, includes a heat transferable label composed of a wax release layer affixed to the surface of the paper sheet and an ink design layer superimposed onto the wax release layer. In the heat transfer labelling process for imprinting designs onto articles, the label-carrying web is subjected to heat, and the laminate is pressed onto an article with the ink design layer making direct contact with the article. As the web or paper sheet is subjected to heat, the wax layer begins to melt so that the paper sheet can be released from the wax layer. After transfer of the design to the article, the paper sheet is immediately removed, leaving the design firmly affixed to the surface with the wax layer exposed to the environment. Although heat transfer labels of the type illustrated in this reference may be employed without an adhesive coating layer over the ink design, it has been determined to be advantageous in many applications to include an adhesive coating layer over the ink design to facilitate adhesion of the transferable layer onto the receiving article.

U.S. Pat. No. 3,922,435 is illustrative of a heat transferable laminate which includes an adhesive coating layer over the ink design layer. The release layer disclosed in this reference is of the dry-type release, which unlike the wax-based release disclosed in U.S. Pat. No. 3,616,015 does not melt during transfer, but yet loses adhesiveness as the laminate is heated during transfer so that the backing sheet can be readily and cleanly peeled from the transfer ink design thus avoiding "halo effects", which can occur in wax-based release layers. The adhesive layer referenced in U.S. Pat. No. 3,922,435 is composed of two different compositions depending on the nature of the receiving article. If the receiving article is a polyolefin, the preferred adhesive disclosed is a thermoplastic polyamide, which is non-tacky under normal conditions but becomes tacky during heat transfer temperatures typically of between 300°–450° F. The polyamide adhesive is preferably applied as a lacquer. (Col. 10, lines 55–60). It may be noted, that when the thermoplastic polyamide adhesive is used, the polyolefin bottles are pretreated by passing the bottles through a hot gas flame to pretreat, i.e. preflame, the polyolefin bottle surface. (Col. 10, line 60). When polyvinylchloride surfaces, e.g. polyvinylchloride bottles, are to be labelled, the preferred heat activatable thermoplastic adhesive may be either a polyamide or vinyl acrylic resin. The vinyl acrylic material used as an adhesive as disclosed in this reference is either a blend of a copolymer of a vinyl resin such as polyvinylbutyrate with an acrylic resin such as that formed from acrylic acid or derivatives thereof such as methyl methacrylate. (Col. 11, lines 7–14).

U.S. Pat. No. 3,516,842 discloses a heat transfer label having a wax-type release layer on a carrier web, the release layer is superimposed with a design print layer overcoated with an adhesive layer. The adhesive layer composition disclosed is composed of a polyamide preferably applied as a lacquer solution over the ink design layer. (Col. 3, lines 55–60). Thus, although the release layer in this reference is a wax-based release, the adhesive disclosed is a polyamide-based adhesive of the type referenced in the foregoing patent, U.S. Pat. No. 3,922,435 employing a dry-type release.

U.S. Pat. No. 3,984,167 illustrates a heat transferable label for decorating ceramic ware. The label disclosed in this reference is composed of a paper web overcoated with a release layer, typically a wax-based release, in turn overcoated with an ink design layer and a thermoplastic adhesive coating layer over the ink design. The adhesive composition disclosed in this reference is a solvent-based adhesive, which is applied as a thermally activated adhesive lacquer. The composition of the adhesive lacquer is referenced in Examples IV–VIII. The components of the adhesive formulation set forth in Examples IV–VI are mixtures of polyethylene, dibutylphthalate, polyvinyl acetate and solvent. The adhesive lacquer formulation disclosed in Examples VII and VIII is composed of mixtures of polybutylmethacrylate, polyglycol, dibutylphthalate, and solvent (Example VII) or the mixture of polyglycol, dibutylphthalate, polyvinylacetate, and solvent (Example VIII).

U.S. Pat. No. 2,746,877 illustrates a heat transferable laminate which also includes an adhesive coating over a composite print design layer. The release coating may be either a wax-based coating as in FIG. 2 or a dry-release type coating as shown in FIG. 1. The composition of the adhesive layer is referenced at Col. 4, line 64 to Col. 5 line 4. The adhesive is activated either by heat applied during transfer or by a suitable solvent applied to the surface of the receiving article. The only reference to specific composition for the adhesive layer is that it may be composed of pigmented resinous adhesives, such as a maleate resin, an acrylic resin, or polyvinylmethyl ether. (Col. 5 lines 1–3).

U.S. Pat. No. 3,007,829 discloses a heat transferable label for use in decorating chinaware, glassware, pottery, and porcelain ware. The heat transferable laminate disclosed in this reference includes a heat activatable adhesive coating over the transferable vitreous design layer. The heat transferable label includes a heat release coating between the carrier web and the vitreous design layer. The thermoplastic or heat activatable adhesive layer disclosed therein is composed of a temporary bonding agent for affecting preliminary adherence of the vitreous design to the article being decorated. The temporary bonding agent is a thermoplastic resinous adhesive, such as maleic modified or maleate resin, acrylic resin, vinyl resin, and polyvinylmethyl ether. (Col. 8, lines 15–28) Improved results were reportedly obtained with a modified ethylcellulose lacquer residue containing a suitable plasticizer such as chlorinated diphenyl and an ester gum. Since the heat transferable laminate disclosed in this reference is applied to porcelain or chinaware, the transferred laminate is subsequently subjected to a high temperature firing to fuse the laminate to the article. During firing, the organic components contained in the vitreous design layer as well as the temporary adhesive layer are completely consumed so that only the pigmented flux component of the vitreous design remains in tact on the article.

Prior art references are apt to include statements that adhesive compositions for heat transferable laminates may be selected from conventional thermoplastic adhesive lacquers. However, closer inspection of the prior art reveals few specific formulations actually suitable for use in heat transfer laminates. As a practical matter, formulation of suitable adhesive coatings for heat transfer laminates poses very difficult problems since the adhesive must satisfy a host of specific adhesive, heat activatable, tack, melting and film-forming characteristics at low coating weights and maintain film integrity on transfer of the laminate to an article. Although a variety of plastic bottles may be decorated through the use of heat transferable laminates, it is appreciated by those skilled in the art that the most common type of plastic bottle or container to be decorated is composed of a polyolefin. It is a recognized disadvantage, however, that when decorating polyolefin bottles with heat transferable laminates employing prior art adhesives, the bottles must be subjected to preflaming operation prior to transferring the laminate thereto. The hot gas flame used in the preflaming operation causes surface oxidation of the polyolefin material, which in turn permits a uniform adhesion of the transferred laminate during subsequent heat transfer of the laminate onto the bottle. Preflaming of polyolefin bottles has been found necessary with conventional adhesives employed in heat transfer labels suitable for transfer onto polyolefins.

The necessity of preflaming polyolefin articles when employing conventional adhesive for heat transferable laminates adds considerably to the complexity and expense of the process and limits the production rate at which these bottles may be decorated.

Accordingly, it is an object of the present invention to provide an improved adhesive coating for heat transferable laminates which eliminates the need of preflaming polyolefin articles prior to the step of decorating such articles with heat transferable laminates.

It is an important object of the present invention to provide an adhesive coating formulation for heat transferable laminates which is equally suitable for effecting transfer and adhesion of the laminate to polyolefin.

Another object of the invention is to provide an adhesive coating for heat transferable laminates which is coatable at low coating thickness on conventional release layers and ink design layers, and yet maintains its film integrity during heat transfer of the laminate to an article.

Another object is to provide an adhesive coating exhibiting highly sensitive heat activatable tackification in very short heat contact time.

SUMMARY OF THE INVENTION

In accomplishing the foregoing and related objects, a heat transferable laminate is provided having an improved adhesive coating layer. The heat transferable laminate is composed of a carrier support, typically of paper or plastic film, affixed to a heat transferable substrate containing a release layer, an ink design layer, and improved adhesive coating thereon. The laminate is pressed onto a receiving article, typically a plastic bottle or container, with the adhesive coating of the laminate contacting the article. As heat is applied to the carrier, the transferable substrate containing the design image transfers to the article.

The improved adhesive coating is a solvent-based adhesive mix, applied preferably by gravure, to achieve a very thin uniform adhesive coating on the laminate. Specifically, after the adhesive coating is dried and the solvent evaporated therefrom, the dried adhesive coating has a uniform thickness of less than about 1 mil, preferably less than about 0.2 mil.

The improved adhesive coating formulation contains essentially an adhesive component and a film-forming component selected from compatible primary and secondary film-forming resins, blended with a miscible solvent.

The adhesive component contains a blend of components—($a_1$) vinylacetate/ethylene copolymer and ($a_2$) styrene-based resin. The styrene-based resin is selected from polystyrene homopolymer and styrene copolymers.

The dry adhesive coating and adhesive components ($a_1$) and ($a_2$) have a softening point within a range between about 200° F. to 600° F., preferably between about 200° F. to 400° F. The solids content, i.e. nonsolvent components, in the adhesive formulation preferably is 15 to 30 percent by weight of the adhesive mix. After solvent is included to form the adhesive mix, preparatory to coating, the mix has a viscosity between about 30 to 80 centipoise, preferably between about 40 to 60 centipoise. The vinylacetate/ethylene copolymer preferably has a vinylacetate content greater than about 30 percent by weight. The preferred weight ratio of components $a_1$ and $a_2$ in the adhesive coating is in a range between about 0.1/1 to 10.0/1.

The adhesive coating formulation of the present invention represents an improvement over prior art adhesive for heat transferable laminates, since it is equally suitable for use in application of the transfer substrate to a wide variety of plastics including polyolefins, polystyrene, and polyvinylchloride. The improved adhesive formulation has unexpectedly resolved a long-standing prior art problem, namely it has obviated the need to pretreat polyolefin articles as by preflaming these articles prior to applying the transfer substrate.

The adhesive formulation tackifies within very short contact time of a hot platen to the carrier, that is within one or two seconds, preferably within 0.10 second at temperatures of about 300° F. to 600° F., most preferably between about 300° F. to 450° F. The present adhesive formulation has the additional important advantage that at the desired low coating thickness, less than 1 mil (dry), preferably less than 0.2 mil (dry), it is uniformly coatable over conventional release layers, typically composed of a wax or dry nonwax-based release film. It is simultaneously uniformly coatable at these low thicknesses over conventional inks employed in heat transferable laminates. Additionally, the adhesive coating has the property that it maintains film integrity during heat transfer to receiving articles being decorated, thus preventing image distortion. The adhesive coating additionally has high optical clarity, exhibits the required degree of bonding strength for the receiving article, as well as the ink design layer and resists abrasion and rubbing as a result of handling the decorated article.

DETAILED DESCRIPTION

Figure 1:
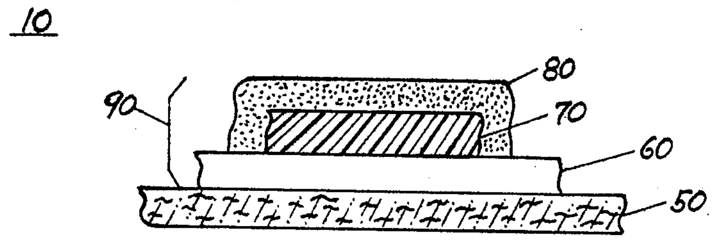
FIG. 1 is a preferred embodiment of the composite heat transfer laminate of the invention.

The preferred embodiment of the heat transferable laminate 10 of the invention as illustrated in FIG. 1 is composed of a carrier web 50, typically paper, overcoated with a release layer 60 and ink design layer 70. A thermoplastic adhesive coating 80 is included over ink design layer 70. Release layer 60, design layer 70, and the adhesive coating 80 form a transferable substrate 90, which releases from carrier web 50 upon application of heat to web 50 sufficient to melt release layer 60. As an article of surface is pressed onto the exposed surface of substrate 90, it splits from carrier web 10 and transfers onto the surface of the article leaving ink design layer 70 clearly imprinted on the article. During transfer of substrate 90 to the article, as heat is applied to web 50, release layer 60 melts or softens resulting in diminished adhesiveness between web 50 and transferable laminate 90. Simultaneously, adhesive layer 80 becomes tacky so that as adhesive layer 80 contacts the article to be decorated, the adhesive bond between layer 80 and the article is greater than the adhesive bond between release layer 60 and web 50 resulting in transfer of substrate 90 onto the article. Transfer of substrate 90 onto the article is preferably accomplished by pressing a hot platen or heated applicator roller, heated to a temperature typically between about 300° to 600° F., preferably 300° to 450° F. onto the exposed surface of web 50 for no more than one or two seconds. Preferably the contact time of the heated applicator roller on web 50 is less than one second, preferably for a period of about 0.10 second. Longer dwell times of the heated platen in contact with web 50 are disadvantageous since it may cause distortion of the plastic bottle or container being decorated, and also would result in a decrease in the rate of output of decorated bottles. Since the laminates of the present invention are intended for use in automated, mass production it is important that the contact time between the hot platen and web 50 be kept to a minimum. This requirement along with the temperature requirement for the heated platen imposes constraints on adhesive layer 80.

Adhesive coating 80 must be sensitively heat activatable so that it tackifies within short contact time of the heated platen, that is within one or two seconds, preferably within 0.10 of a second, at platen temperatures between about 200° to 600° F., preferably between about 300° to 450° F. Adhesive coating 80 must also meet a number of other requirements. Adhesive coating 80 must be easily and uniformly applied over release layer 60 and ink design layer 70 to achieve thicknesses (dry) of less than about 1 mil, preferably less than 0.2 mil. In order to achieve a uniform coating of such small thickness (dry), a solvent-based system for the adhesive is employed. Adhesive coating 80 may be applied by cast-coating techniques, preferably gravure, capable of uniformly applying solvent-based adhesive 80 within this low range of thickness.

Thus, adhesive coating 80 has the advantage that at the desired low coating thickness, less than 1 mil (dry), preferably less than 0.2 mil (dry), it is uniformly coatable over release layer 60 which may be composed of a wax or dry nonwax-based release film. It is also uniformly coatable at these low coating thicknesses over conventional inks employed in heat transfer laminates. Adhesive coating 80 must be thermoplastic so that it softens and tackifies upon application of heat at the required temperature level, between about 300° to 600° F., but yet remains sufficiently cohesive to ink design layer 70 both before and after transfer in order that ink design layer 70 does not separate from adhesive layer 80. Adhesive coating 80 meets all of the foregoing requirements, and additionally is believed to represent an improvement over prior art adhesives for heat transferable laminates in that the adhesive formulation is equally suitable for use in application of the transferable laminate to a wide variety of plastics. In particular it is equally suitable for application onto both polyolefin plastics as well as polystyrene and polyvinylchloride materials, and also glass. Thus, the adhesive formulation need not be altered when plastics other than polyolefins are to be decorated. Adhesive coating 80 has the additional important advantage when polyolefin plastic bottles or articles are to be decorated in that it eliminates entirely the need for subjecting the polyolefin materials to preflame treatment prior to transfer of the laminate onto the article. It has been common procedure to subject polyolefin plastics to preheat treatment as by subjecting the polyolefin plastic to gas flames having a temperature typically between about 1,000° F. to 3,000° F. for less than about 1 second prior to decorating the articles with heat transferable materials. The preheat or preflame treatment as employed in conventional practice oxidizes the surface of the polyolefin material which permits uniform transfer of the heat transferable laminates and improves the adhesives bond between the transferable laminate and the polyolefin material. This process, of course, is time-consuming in that it is an additional as well as energy-consuming step required for heat transferring laminates onto polyolefin materials. Additionally, flame pretreatment to be effective must be accomplished under strict flame temperature and contact time control of combustible gases, which imposes difficult operating constraints on the pretreatment process. Thus, the adhesive formulation (coating 80) in addition to meeting all of the foregoing requirements has obviated the need for subjecting polyolefin bottles and articles to preheat treatment prior to transfer of the laminate thereon.

Release layer 60 is preferably a wax-based release layer which has a melting point below the softening point of adhesive coating 80. Release layer 60 is preferably a wax-based release which advantageously includes a montan wax. Release compositions of this type are disclosed in U.S. Pat. No. 3,616,015 herein incorporated by reference. Release layer 60 may include other waxes or combination of waxes and resins as in U.S. Pat. No. 2,990,311 or may be a dry-nonwax thermoplastic film, preferably of crystalline polypropylene, as in U.S. Pat. No. 3,922,435. Release layer 60, if wax-based, is coated onto carrier 50 preferably by conventional hot melt coating techniques. Adhesive layer 80 has the advantage that it is coatable over wax-based or dry nonwax release films 60. Transferable substrate 90 may contain additional barrier coatings between release layer 60 and ink design layer 70. Inclusion of a barrier coating is optional and often employed to retard the chance of seepage of ink from design layer 70 into release layer 60. Inclusion of a barrier coating, if employed, also affords added protection to the design layer 70 after substrate 90 has been transferred to a receiving article. It should also be appreciated that other polymeric coatings may be included between ink design layer 70 and adhesive layer 80. Coatings between ink design 70 and adhesive 80 may be employed typically as a protective coating over ink design layer 70. Inclusion of these additional layers, while optional, is nonetheless intended to be within the scope of application of the adhesive coating 80 formulation of the present invention as applied to heat transferable laminates.

Any type of ink conventionally employed in heat transferable laminates is suitable for use in ink design layer 80. The preferred inks have the property that they do not soak into the release coating 60 when applied without a barrier layer. While a wide range of ink formulations may be employed for design layer 70, the most suitable ink formulations are typically of nitrocellulose polyamide-based ink utilizing conventional pigments such as carbon black and compatible solvents. Another suitable ink is an acrylic resin-based ink typically one composed of an ink vehicle formed of isobutylmethacrylate resin binder, carbon black pigment, and compatible solvent. It is preferably to apply ink design layer 70, adhesive layer 80, and optional barrier layer 60 employing the same coating technique. The rotogravure method is the preferred method of applying each of the coating layers 60, 70, and 80.

The preferred formulation for heat activated adhesive coating 80 is a thermoplastic solvent-based adhesive composed of an adhesive, resinous component (a) containing ($a_1$), a copolymer of vinyl acetate and ethylene, and ($a_2$), a styrene-based resin, and (b), a film-forming component, (c), plasticizers (optional), and (d), compatible solvents. Applicant has determined that the preferred adhesive, resinous component (a) for the solvent-based adhesive formulation is composed of ($a_1$), a vinyl acetate/ethylene copolymer in nonreacting mixture with ($a_2$), a styrene-based resin selected from polystyrene homopolymer and styrene copolymers. It has been determined that the vinyl acetate/ethylene copolymer ($a_1$) should be selected such that it has a vinyl acetate content greater than about 30 percent by weight in order that copolymer ($a_1$) may be adequately solubilized in conventional solvent. If the vinyl acetate content is less than 30 percent by weight, the solubility of the vinyl acetate/ethylene copolymer is too limited to obtain a uniform coating of adhesive 80 at the desired low coating thickness (dry) of less than about 1 mil, preferably less than 0.2 ml, more preferably between about 0.1 to 0.2 mil.

The physical requirements of the adhesive polymer components, $a_1$ and $a_2$, are that they each have a Ball and Ring softening point which falls within a range between $T_1$ and $T_2$, wherein $T_1$ is about 100° F. less than the minimum temperature at which transfer occurs, and $T_2$ is about the maximum temperature at which transfer occurs. Thus, since it is desirable to accomplish transfer of substrate 90 at a temperature between about 300° to 600° F., preferably between about 300° to 450° F., it is required that the dry adhesive coating 80 and each of the adhesive components $a_1$ and $a_2$ have a tackification point, and Ball and Ring softening points between about 200° to 600° F., preferably 200° to 400° F., more preferably 200° to 300° F. The vinyl acetate/ethylene copolymer component, ($a_1$) and styrene-based resin, ($a_2$) having softening points within this range are commercially available. Components $a_1$ and $a_2$ do not copolymerize during admixture or during heating to effect transfer of the substrate 90 to an article.

The softening point and tackification point of dry adhesive coating 80 and adhesive components $a_1$ and $a_2$, within the above-stated range of between 200° F. to 600° F., preferably 200° F. to 400° F., permits the use of desired wax-based release 60 having a melting point below that of the softening point of each of the adhesive resins. This permits softening of the wax release layer during transfer immediately prior to softening and tackification of adhesive layer 80. Additionally, the softening point for the dry adhesive coating 80 and adhesive components $a_1$ and $a_2$ therein within the above-stated range is high enough to prevent the occurrence of premature tack of the adhesive coating during storage of laminate 10 or residual tack on the surface of the substrate 90 after it has been transferred onto the receiving article. Thus, the transferred substrate 90 and transferred adhesive coating 80 is virtually free of residual tack to the human touch upon inspection or handling of the decorated article. The transferred adhesive coating 80 also has the advantage that it will not retackify after the articles have been decorated even when the decorated articles are stored under warm environmetal or high humidity conditions.

Another advantage of each of the adhesive components $a_1$ and $a_2$ is that they exhibit a high optical clarity. Since adhesive coating 80 may be transferred onto plastic articles or glass, which may characteristically be optically clear, it is important that the adhesive be of high optical clarity so that the presence of the adhesive layer on the article is not discernible with the naked eye. It is thus peferable that each of the adhesive resin components $a_1$ and $a_2$ exhibit a Gardner color number of less than about 6. The preferred adhesive components $a_1$ and $a_2$ typically exhibit Gardner color numbers of under 4, which is an additional favorable characteristic of these components.

Although each of the components $a_1$ and $a_2$ of the formulation exhibit adhesive properties sufficient to bond substrate 90 to the article, applicant has determined that only when these two components are present in admixture are all of the remaining physical requirements of the heat transfer laminate, and in particular film integrity and plasticity, obtainable. Applicant has determined upon experimentation that if the vinyl acetate/ethylene copolymer (component $a_1$) is used alone without inclusion of styrene monomer-based resin (component $a_2$), adhesive coating layer 80 becomes too rubbery. If the styrene monomer-based resin (component $a_2$) is employed alone, adhesive coating 80 yields a film which is too brittle. Attainment of the required film-forming and coatability characteristics of adhesive coating 80 at the required low coating thickness of less than 1 mil, imposes significant constraints on formulating a suitable adhesive. Specifically, applicant has determined that an adhesive coating thickness (dry) should be less than about 1 mil, preferably less than 0.2 mil, typically 0.1 to 0.2 mil. The film integrity of the adhesive coating 80 must be maintained during transfer to the article to prevent image distortion. However, it is most difficult to obtain an adhesive formulation coatable at such low thickness which does not lose its film integrity during transfer to an article at transfer temperatures high enough to melt release layer 60, e.g. between about 300° F. to 400° F. Film integrity during transfer is all the more difficult to maintain since adhesive coating 80 must become sufficiently tacky during transfer, a requirement which tends to disrupt film integrity and cause film shrinkage or crawl particularly at low coating thickness. Adhesive coating 80, once transferred onto the article with ink design 70, must also resist abrasion and rubbing as a result of handling the decorated article. Adhesive coating 80 after transfer to the article must also resist adhesive deterioration for at least 10 seconds of exposure of the article's surface to water. These results have been obtained with the adhesive formulation of the invention without preheating or preflaming the articles prior to transfer of adhesive 80 and substrate 90 thereto. Thus, it must be appreciated that adhesive 80 must satisfy a wide array of physical property requirements. The adhesive formulation of the present invention satisfies all these requirements and thus results in important advantages over prior art adhesive composition for heat transferable laminates.

Suitable vinyl acetate/ethylene copolymers for use in adhesive component ($a_1$) of the present formulation are commercially available under the ELVAX tradename from DuPont de Nemours Co. or under the tradename VYNATHENE or ULTRATHENE avialable from U.S.I. Chemicals Co. Suitable styrene-based resins (component $a_2$) for use in the present adhesive mixture, are commercially available under the tradename designation PICCOLASTIC, PICCOTONER, or KRISTALEX resins available from the Hercules Chemical Co. PICCOLASTIC resins are thermoplastic hydrocarbon resins of pure polystyrene, and KRISTALEX resins are thermoplastic hydrocarbon resins produced by copolymerization of alphamethyl styrene and related pure aromatic monomer. PICCOTONER resin is a thermoplastic hydrocarbon resin of styrene/acrylic copolyer.

A preferred vinyl acetate/ethylene copolymer under the ELVAX series has been determined to be ELVAX 40. If component $a_1$ is selected from the VYNATHENE series of vinyl acetate/ethylene copolymer, a preferred VYNATHENE is VYNATHENE EY902-30. Although VYNATHENE EY902-30 is preferred, component $a_1$ may be selected from any of the VYNATHENE EY900 series wherein the vinyl acetate content of the vinyl acetate/ethylene copolymer is greater than 30 percent by weight. Suitable vinyl acetate/ethylene copolymer may also be selected from the ULTRATHENE series having a vinyl acetate content greater than 30 percent by weight. If polymer component $a_1$ is selected from the ULTRATHENE series, applicant has determined that a preferred series is ULTRATHENE UE638-35 or UE634-35. The preferred vinyl acetate-/ethylene copolymer as above-referenced is selected on the basis of copolymers having a vinyl acetate content greater than about 30 percent by weight, and also having a Ball and Ring softening point of between about 200° to 600° F., preferably between 200° to 400° F.

Preferred, styrene-based resin (component $a_2$) for use in the adhesive formulation of the present invention may be advantageously selected from the PICCOLASTIC and KRISTALEX series of styrene-based hydrocarbon resins available from the Hercules Co. If the KRISTALEX series is used, the preferred series is KRISTALEX 3100 resins; and if the PICCOLASTIC series is used, the preferred series is PICCOLASTIC D100 resins. If the PICCOTONER series is used, the preferred form is PICCOTONER 1200 resin.

The film-forming component (component b) which is included in the adhesive formulation may be selected from any primary and secondary film-forming resin which is compatible with the adhesive resin ($a_1$ and $a_2$) mixture (component a) and having properties consistent with achieving the aforementioned film-forming characteristics of the adhesive coating. The film-forming components must also be selected so that they are mutually compatible with the solvent system used in the formulation. Preferred film-forming components may be selected from acrylic resins, acrylic rubber, nitrocellulose, polyamide resin, polyester, and vinyl acetate/vinyl chloride copolymer. A preferred polyamide film-forming resin is available under the tradename MACROMELT from the Henkel Corp. of Minneapolis, Minn. A preferred acrylic rubber is available under ALKYDOL tradename from Reinhold Chemical Co. A preferred polyester resin is a linear multiaromatic acid-based polyester available under the VITEL tradename from Goodyear Company of Akron, Ohio. A preferred acrylic resin for use as the film-forming component (b) is a butylmethacrylate-based resin available under the tradename ELVACITE from DuPont de Nemours Co. of Wilmington, Del. Nitrocellulose film-forming components are widely available commercially from Hercules Co., and vinyl acetate/vinyl chloride copolymer resins are available under the tradename BAKELITE vinyl solution resins VINYLITE-VYHD from Union Carbide Corp. of Danbury, Conn. The film-forming components (b) enhance the coatability and film-forming characteristics of the adhesive resin components (a) and also impart durability, scuff resistance, and chemical resistance to adhesive coating 80.

The plasticizer (component c), may optionally be included to impart added plasticity to the adhesive coating 80. The plasticizers which may be used can be selected from conventional plasticizers, which would be compatible with the selected film-forming component. Inclusion of plasticizers in the formulation is not required, but may be included to reduce the chance of the coated adhesive layer 80 from developing cracks or fissures, that is becoming brittle, when exposed to the environment for long periods of time. Plasticizers may also be included to impart greater flexibility to adhesive coating 80 to facilitate transfer of substrate 90 to irregularly shaped receiving articles. Suitable plasticizers which may be used alone or in combination may be typically selected from the following group: n-ethyl o-p-toluene sulfonamide (e.g. Santicizer 8 resin from Monsanto Chemical Co.); tricresyl phosphate; and butylbenzlphthalate (e.g. Santicizer 160 resin from Monsanto Chemical Co.).

The last group of components included in the formulation for the adhesive coating 80 is the solvent (component d). The solvent is selected so that all of the components in the adhesive formulation are all soluble therein. This may be achieved by forming a blend of solvent mix composed of constituents which are miscible with each other and are known solvents for at least one of the components of the adhesive formulation. Using this approach, it has been found desirable to include aromatic-based solvents such as toluene and xylene, which are known solvents for the adhesive resin mixture (component a). To these aromatic solvents it has been found desirable to add additional miscible solvents which are known solvents for each of the remaining components in the formulation. In this manner, a solvent mix may be conveniently blended to permit each of the components in the adhesive formulation to dissolve therein.

Preferred compositions for the adhesive coating 80 are given in the tables. The specific formulation shown in the tables reflects preferred blends of the ethylene vinyl acetate copolymer and styrene-based resin component (a) as well as preferred film-forming component (b); plasticizers are optional and need not be included. Table 1 illustrates a formulation wherein a plasticizer has been optionally included. A wide range of compatible solvents may be selected to dissolve the dry adhesive coating blend shown in the tables. Solvent is added so that the amount of solids, i.e. nonsolvent components, comprises between about 15 to 30 percent by weight of the mix. After solvent is added, the blend should have a viscosity of about 30 to 80 centipoise, preferably 40 to 60 centipoise. The resulting adhesive mix may then be uniformly coated to yield the desired low coating thickness, less than 1 mil (dry), preferably less than 0.2 mil (dry), preferably employing rotogravure. An illustration of suitable solvents which may be added to achieve the above-mentioned viscosity range and coating thickness of less than 1 mil (dry), preferably less than 0.2 mil (dry), is set forth in the tables.

Although specific formulations for the adhesive coating 80 are given in the tables it has been determined that the adhesive components (a) are preferably present in total in the dry adhesive coating 80 in an amount between about 10 to 90 percent by weight. It has also been determined that a preferred weight ratio of the ethylene/vinyl acetate copolymer and styrene-based resin is in a range between about 0.1/1 to 10.0/1.

TABLE 1

| ADHESIVE COMPONENTS: | WT. % |
|---|---|
| Dry Adhesive Coating 80: | |
| Adhesive Component (a) | |
| Vinyl acetate/ethylene copolymer ELVAX 40 | 7.5 |
| Styrene-based resin KRISTALEX 3100 | 62.0 |
| Film-forming Component (b) | |
| Acrylic Rubber | 30.5 |
| ALKYDOL 44-800 | |
| TOTAL | 100.0 |
| Adhesive Coating 80 with Solvent: | |
| Solvent Composition[1] | |
| Toluene | 100.0 |

[1]Solvent added in amount 300 parts by weight solvent per 100 parts by weight dry adhesive coating 80 (above).

TABLE 2

| ADHESIVE COMPONENTS: | WT. % |
|---|---|
| Adhesive Component (a): | |
| Vinyl acetate/ethylene copolymer VYNATHENE EY 901-25 | 21.1 |
| Styrene-based resin KRISTALEX 3100 | 54.0 |
| Film-forming Component (b): | |
| Vinyl acetate/Vinylchloride copolymer VINYLITE VYHD | 14.9 |
| Plasticizer (c): | |
| n-ethyl o-p-toluene sulfonamide | 10.0 |
| TOTAL | 100.0 |
| Adhesive Coating 80 with Solvent: | |
| Solvent Composition[1] | |
| Toluene | 67.0 |
| Ethyl Acetate | 33.0 |
| TOTAL | 100.0 |

[1]Solvent added in an amount of 300 parts by weight total solvent per 100 parts by weight for dry adhesive coating 80 (above).

TABLE 3

| ADHESIVE COMPONENTS: | WT. % |
|---|---|
| Dry Adhesive Coating 80: | |
| Adhesive Component (a) | |
| Vinyl acetate/ethylene copolymer VYNATHENE EY 901-25 | 25.0 |
| Styrene-based resin PICCOLASTIC D-100 | 20.0 |
| Film-forming Component (b) | |
| Vinyl acetate/Vinylchloride Copolymer VINYLITE VYHD | 15.0 |
| Polyester Resin | |
| VITEL PE 200 D | 30.0 |
| VITEL VPE 5545 | 10.0 |
| TOTAL | 100.0 |
| Adhesive Coating 80 with Solvent: | |
| Solvent Composition[1] | |
| Toluene | 67 |
| Ethyl Acetate | 8 |
| Methyl ethyl ketone | 25 |
| TOTAL | 100 |

[1]Solvent added in an amount of 300 parts by weight total solvent per 100 parts by weight for dry adhesive coating 80 (above).

Adhesive coating 80 may be prepared from any of the formulations shown in the tables by adding the listed dry components in the proportion shown to a suitable mixing vessel. Solvent is added in the proportions shown in the tables, and the vessel stirred at ambient temperature until a homogeneous blend is obtained. The mixture is then coated at ambient temperature, preferably by gravure, over ink design layer 70, thus forming the wet adhesive coating 80. Other coating techniques such as reverse roll or flexographic are possible, but gravure is preferred. When coating with gravure technique, the coating thickness is conveniently adjusted by use of proper gravure cylinders. Application of the adhesive coating applied over ink layer 70 is controlled to achieve a uniform coating thickness of less than about 1 mil. After application, the adhesive coating is then subjected to conventional convective drying, typically at a temperature of about 250° F., to evaporate the solvents therein, leaving a uniform dry adhesive film 80 over ink design layer 70.

Although the invention has been described within the context of particular embodiments for the transferable substrate, the invention is not intended to be limited to any particular composition or layer structure for the transferable substrate. It is known that the transferable substrate may contain other coating layers, for example, a plurality of ink design layers, one or more protective layers over the ink design layers, as well as barrier-type layers between the ink design layer and release layer. The invention is equally applicable to such varying heat transferable structure. It should be appreciated that the adhesive formulation of the invention has wide application as a release coating for any heat transferable substrate in contact with a support member such as a carrier web. The invention, therefore, is not intended to be limited to the description in the specification but rather is defined by the claims and equivalents thereof.

I claim:

1. An improved heat transferable laminate of the type including in sequence a carrier support sheet, a release layer, an ink design layer, and an adhesive coating over the ink design layer said adhesive coating not intermediate the carrier sheet and ink design layer for transfer of said ink design layer and said adhesive coating directly from the carrier support sheet to a receiving article upon application of heat to the carrier sheet while said receiving article contacts the adhesive coating, the carrier support sheet comprising material selected from the group consisting of paper and plastic film wherein the improved adhesive coating comprises:

an adhesive resin component which tackifies in a period of less than about 2 seconds when elevated to a temperature between about 200° to 600° F., the adhesive resin component comprises a blend of vinyl acetate/ethylene copolymer and a styrene-based resin, wherein said adhesive resin component permits bonding of the ink design layer to plastic articles including plastic articles comprising a polyolefin without oxidizing the surface of said plastic article prior to said transfer.

2. A heat transferable laminate as in claim 1 wherein the vinyl acetate content in said vinyl acetate/ethylene copolymer comprises at least about 30 percent by weight.

3. A heat transferable laminate as in claim 1 wherein the adhesive component tackifies in a period of less than about 0.1 second when elevated to a temperature between about 200° F. to 600° F.

4. A heat transferable laminate as in claim 1 wherein the adhesive coating is applied over the ink design layer by the gravure method, said adhesive coating having a viscosity of between about 30 to 80 centipoise during said gravure application.

5. A heat transfer laminate as in claim 2 wherein the styrene-based resin comprises polystyrene homopolymer.

6. A heat transfer laminate as in claim 1 wherein the styrene-based resin comprises a styrene copolymer.

7. A heat transferable laminate as in claim 1 wherein the adhesive coating has a thickness of less than about 1 mil.

8. A heat transferable laminate as in claim 7 wherein the adhesive coating has a thickness of less than about 0.2 mil.

9. A heat transferable laminate comprising a carrier support sheet and a heat transferable substrate comprising in sequence a release layer in contact with the carrier support sheet, an ink design layer, and an adhesive coating over the ink design layer said adhesive coating not intermediate the carrier sheet and ink design layer, said substrate transferable directly from the carrier support sheet to a receiving article upon application of heat to the carrier while said receiving article contacts the adhesive coating, the carrier support sheet comprising material selected from the group consisting of paper and plastic film, the adhesive coating comprising:

an adhesive resin component which tackifies in a period of less than about 2 seconds when elevated to a temperature between about 200° F. to 600° F., the adhesive resin component comprising a blend of vinyl acetate/ethylene copolymer and a styrene-based resin, wherein said adhesive resin component permits bonding of the transferable substrate to plastic articles including plastic comprising a polyolefin without oxidizing the surface of said plastic article prior to transfer.

10. A heat transferable laminate as in claim 9 wherein the vinyl acetate content in said vinyl acetate/ethylene copolymer comprises at least about 30 percent by weight.

11. A heat transferable laminate as in claim 9 wherein the styrene-based resin comprises polystyrene homopolymer.

12. A heat transferable laminate as in claim 9 wherein the styrene-based resin comprises a styrene copolymer.

13. A heat transferable laminate as in claim 9 wherein the adhesive coating is applied over the ink design layer by the gravure method, said adhesive coating having a viscosity of between 30 and 80 centipoise during said gravure application.

14. A heat transferable laminate as in claim 13 wherein the adhesive coating has a thickness of less than about 1 mil.

* * * * *